(12) United States Patent
Gutkin

(10) Patent No.: US 6,699,615 B2
(45) Date of Patent: Mar. 2, 2004

(54) ELECTRICAL BATTERY

(75) Inventor: Timofei Gutkin, Hamburg, NJ (US)

(73) Assignee: I. Zborovsky, Dix Hills; part interest ( * ) Notice: Subject to any disclaimer, the term of this patent is extended or adjusted under 35 U.S.C. 154(b) by 136 days.

(21) Appl. No.: 09/883,154

(22) Filed: Jun. 18, 2001

(65) Prior Publication Data

US 2002/0192541 A1 Dec. 19, 2002

(51) Int. Cl.[7] .............................................. H01M 2/38
(52) U.S. Cl. ........................ 429/68; 429/122; 429/204; 429/205; 429/233; 429/234
(58) Field of Search .................... 429/67, 68, 81, 429/122, 130, 204, 205, 233, 234, 237

(56) References Cited

U.S. PATENT DOCUMENTS

| | | | | |
|---|---|---|---|---|
| 5,512,390 A | * | 4/1996 | Obushenko | 429/204 |
| 5,614,332 A | * | 3/1997 | Pavelle et al. | 429/68 |
| 5,976,730 A | * | 11/1999 | Gutkin | 429/234 |
| 6,177,799 B1 | * | 1/2001 | Martineau et al. | 429/90 |
| 6,225,001 B1 | * | 5/2001 | Gutkin | 429/234 |
| 6,376,115 B1 | * | 4/2002 | Tsai et al. | 429/68 |
| 6,436,579 B1 | * | 8/2002 | Gutkin | 429/233 |
| 6,458,480 B1 | * | 10/2002 | Morris et al. | 429/68 |

* cited by examiner

*Primary Examiner*—Bruce F. Bell
(74) *Attorney, Agent, or Firm*—I. Zborovsky

(57) ABSTRACT

An electrical battery has a vessel accommodating an electrolyte, a positive electrode and a negative electrode arranged in the vessel at a distance from one another in contact with the electrolyte, and a partition arranged in the vessel between the electrodes so that positive ions formed by an electrolytic process from a material of the positive electrode in the electrolyte move toward one side of the partition, and negative ions formed by an electrolytic process from a material of the electrolyte move to an opposite side of the partition during charging of the battery, so that the positive ions and the negative ions at both sides of the partition are attracted to one another and accumulate at both sides of the partition in great quantities so as to provide a significant charge in the battery, one of the electrodes being movable toward the partition to be located in a zone of accumulation of the ions of corresponding charge so as to obtain the charge with high voltage, so that a discharge of the battery is performed at high power, with high voltage and low current.

6 Claims, 4 Drawing Sheets

ELECTRICAL BATTERY

BACKGROUND OF THE INVENTION

Electrical batteries are known and widely utilized. Known electrical batteries include a vessel which accommodates an electrolyte, and two electrodes which are arranged in a vessel and covered with electrolytes. A known electrolytic process takes place in the electrical batteries, an electrical current is supplied by the electrical battery to a consumer. A disadvantage of the known batteries is that in a battery of reasonable size, it is not possible to accumulate a high electrical charge, so as to provide a discharge of the battery and therefore consumption of an electrical energy for long time. Therefore, conventional electrical batteries must be frequently discharged. In the majority of motor vehicles the recharging of the batteries is formed from an internal combustion engine. As for electric cars, the recharging of the battery must be over a very short time, which is the main cause of the fact that there are very few electrical cars on the market.

SUMMARY OF THE INVENTION

Accordingly, it is an object of present invention to provide an electrical battery which avoids the disadvantages of the prior art.

In particular, it is an object of the present invention to provide an electrical battery which can be charged over a short period of time and accumulate a very high electrical charge, and can be discharged with a very high voltage and a very low current so as to provide an electrical power over a long period of time.

In keeping with these objects and with others which will become apparent herein after, one feature of present invention resides, briefly stated, in an electrical battery which has a vessel accommodating an electrolyte, a positive electrode and a negative electrode arranged in the vessel at a distance from one another in contact with the electrolyte, and a partition arranged in the vessel between the electrodes so that positive ions formed by an electrolytic process from a material of the positive electrode in the electrolyte move toward one side of the partition, and negative ions formed by an electrolytic process from a material of the electrolyte move to an opposite side of the partition during charging of the battery, so that the positive ions and the negative ions at both sides of the partition are attracted to one another and accumulate at both sides of the partition in great quantities so as to provide a significant charge in the battery, one of the electrodes being movable toward the partition to be located in a zone of accumulation of the ions of a corresponding charge so as to obtain the charge with high voltage, so that a discharge of the battery is performed at high power, with high voltage and with low current.

When the electrical battery is designed in accordance with the present invention, it avoids the disadvantages of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
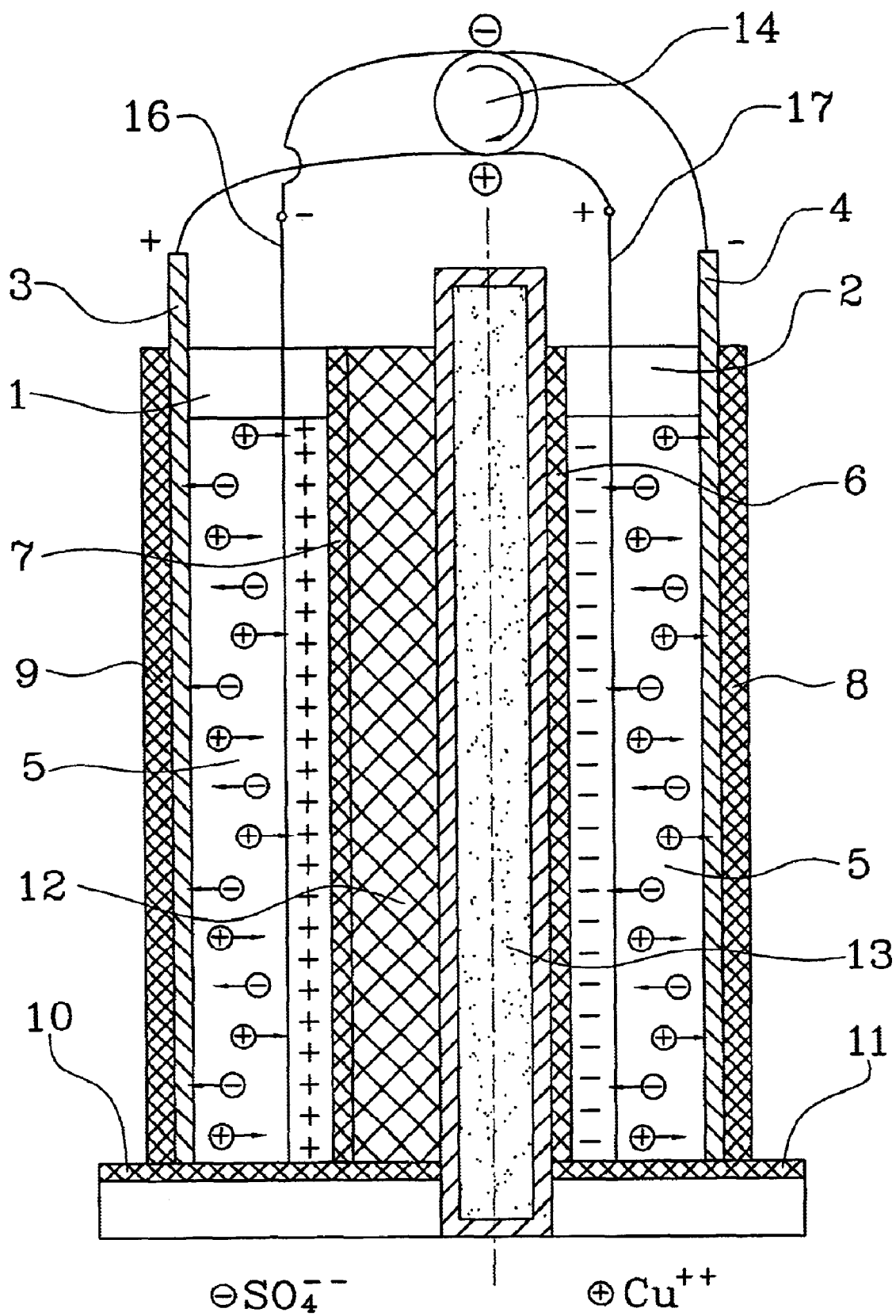
FIG. 1 is a view showing a cross-section of an electrical battery in accordance with the present invention in condition when it is being charged.
Figure 2:
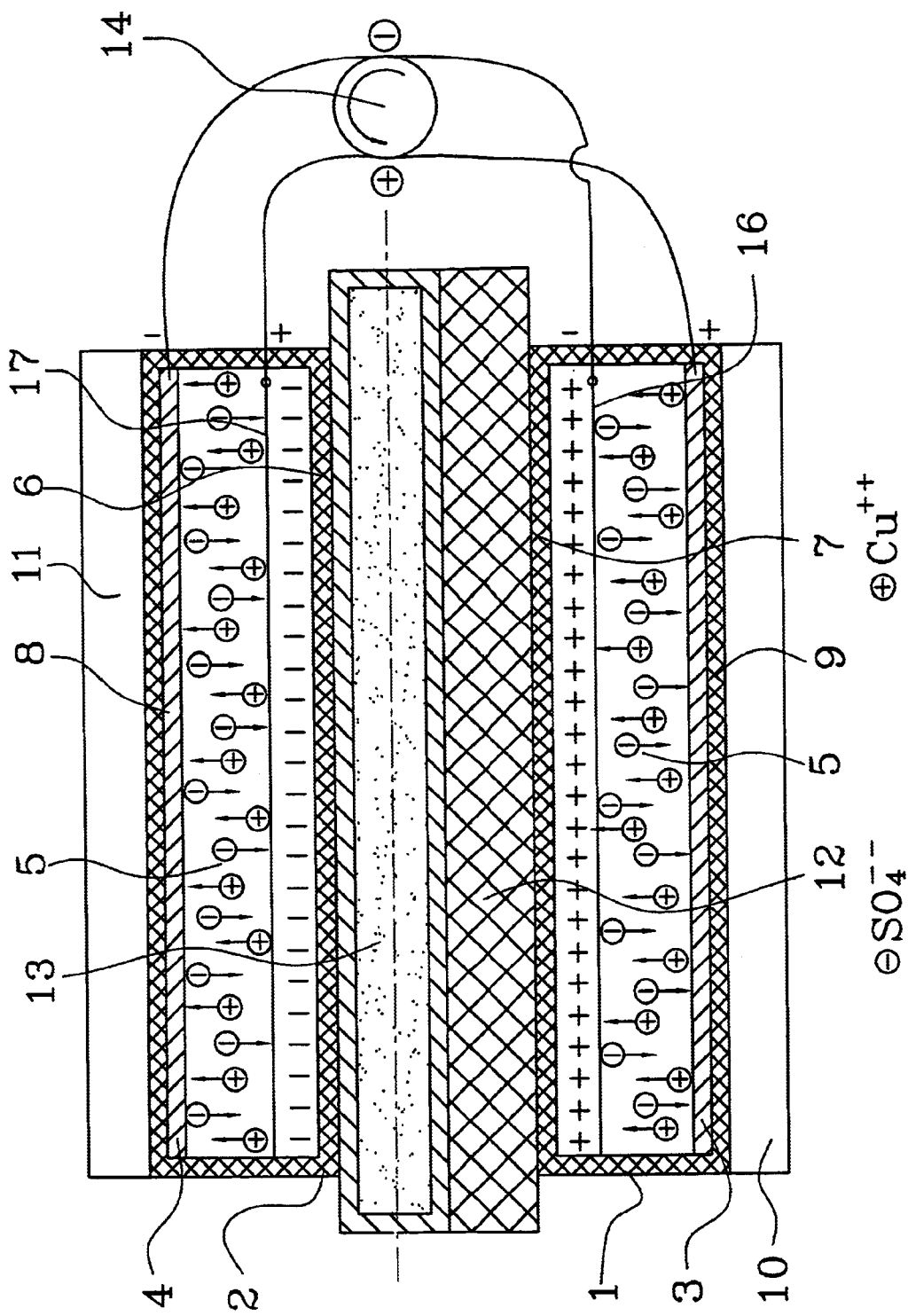
FIG. 2 is a plan view of the electrical battery in accordance with the present invention.
Figure 3:
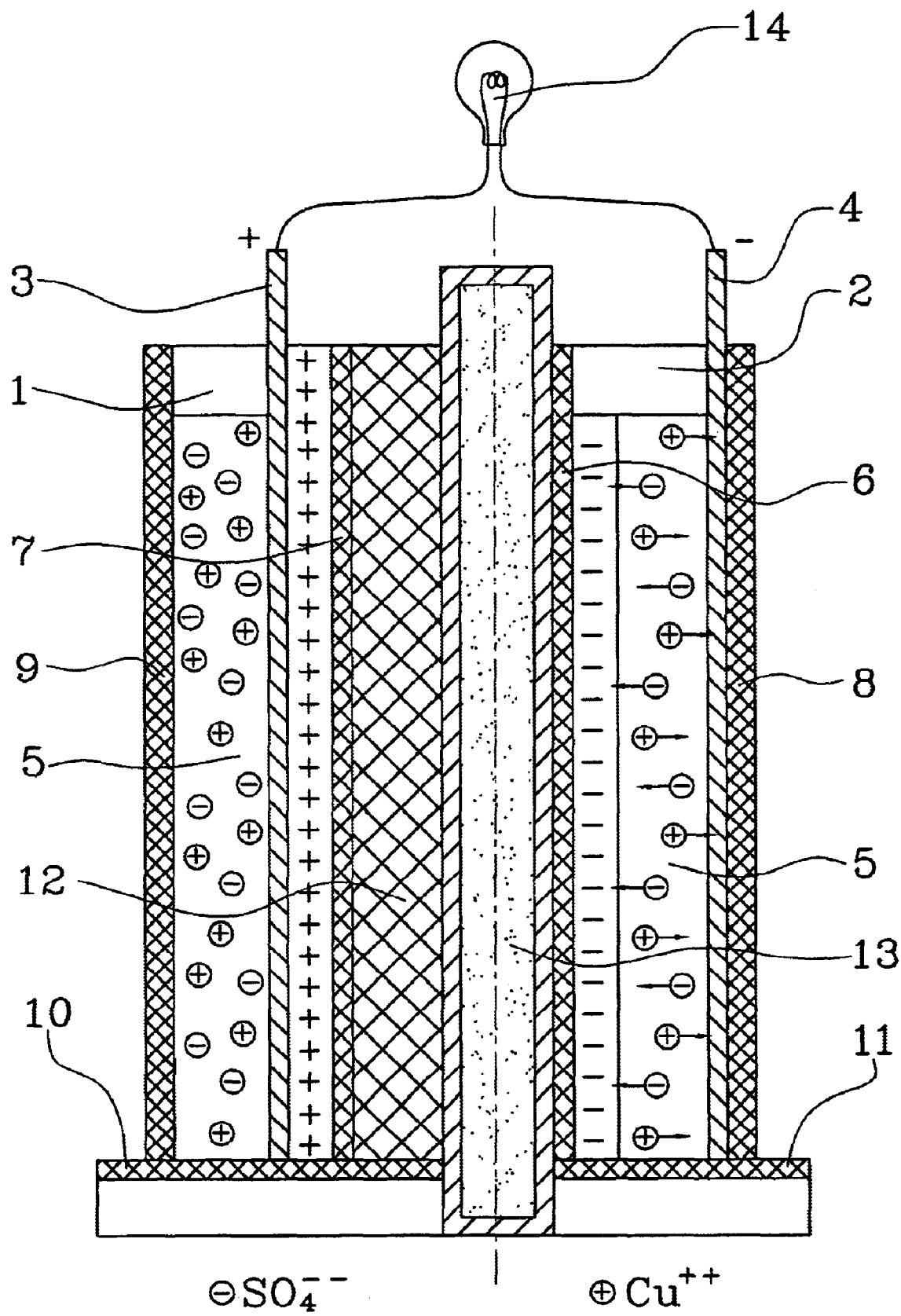
FIG. 3 is a view showing an electrical battery after being charged and in an operative condition when it is ready for discharging.
Figure 4:
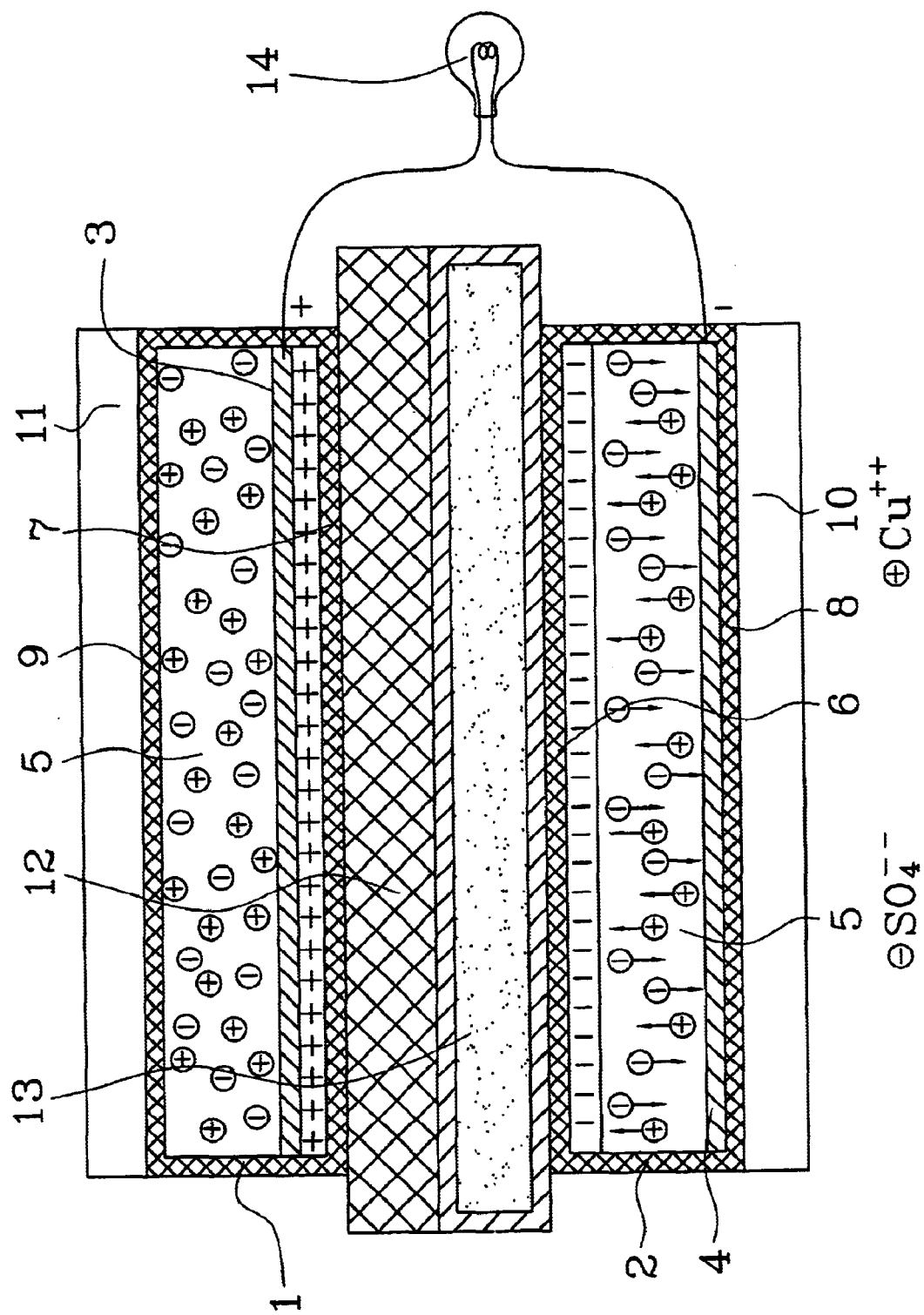
FIG. 4 is a view showing the electrical battery from above, during the discharge.

An electrical battery in accordance with the present invention includes a main vessel which is subdivided into two individual vessels 1 and 2. A positive electrode 3 is introduced into the vessel 1 and a negative electrode 4 is introduced into the vessel 2 and the vessels are filled with electrolyte 5. The vessel 1 has a front wall 7 and a rear wall 9, while the vessel 2 has a front wall 6 and a rear wall 8. The front walls 6 and 7 face one another. The vessels 1 and 2 have bottoms 10 and 11 to hold the vessels in a standing position. A partition is provided between the front walls 6 and 7 of the vessels. The partition includes a plate 12 composed of a dielectric with a high dielectric penetration ability $\epsilon$ (segnetoelectric $\epsilon=3300$). Also, a glass box filled with sodium chloride 13 is arranged in an electric field which is weakened by the dielectric. A plate of melted quartz can be used for this purpose as well.

The electrodes can be composed for example of copper, while the electrolyte can be an aqueous solution $CuSO_4$. The charging of the battery is performed in the following manner:

During the electrochemical process, in the vessel the positive copper electrode 3 located near the rear wall 9 is dissolved due to the interaction of its surface with the ions $SO_4^-$. The ions $SO_4^-$ give their charge to the positive copper electrode 3, they are neutralized, and as a result $CuSO_4$ is formed which in the aqueous solution of the $CuSO_4$ forms ions $Cu^{++}$ and $SO_4^-$. The mass of the positive copper electrode 3 is reduced. The number of negative ions $SO_4^-$ in the electrolyte remains the same without change, since after the reaction with the copper electrode the negative ions $SO_4^-$ are returned into the electrolyte. The newly formed positive ions $Cu^{++}$ near the electrode 3 move to the front wall 7 of the vessel 1 under the action of an electrical field which has a relatively low intensity, forced by an exterior current source 14 having a relatively low voltage. When the positive ions $Cu^{++}$ approach the front wall 7 of the vessel 1, great forces of attraction start acting on them from the great number of negative ions $SO_4^-$ which are accumulated at the opposite side of the partition near the front wall 6 of the vessel 2 provided with the negative copper electrode 4.

The electrochemical process in the vessel 2 with the negative copper electrode 4 is performed in the following manner. Under the action of the electrical field generated by the exterior current source 14, in the vessel 2 ions $Cu^{++}$ in the electrolyte 5 move toward the negative copper electrode 4, they are neutralized, and deposited as atoms of copper on the surface of the negative copper electrode 4. The mass of the copper electrode 4 is increased. The negative ions $SO_4^-$ move under the action of the electrical field in the electrolyte 5 toward the front wall of the vessel 2 and supplement the layer of negative ions. When the negative ions $SO_4^-$ approach the front wall 6, great forces of attraction act on them from the great number of positive ions $Cu^{++}$ at the opposite side of the partition near the front wall 7 in the vessel 1 with the positive electrode 3. Thereby during charging of the battery, near the front wall 6 in the vessel 2 with the negative copper electrode, accumulation of ions $SO_4^-$ with high density takes place.

As a result, the negative ions $SO_4^-$ from the electrolyte 5 in the vessel 2 are concentrated near the front wall 6 while the positive ions $Cu^{++}$ from the vessel 2 move to the negative copper electrode 4, are neutralized on it, and copper atoms are deposited on the copper electrode 4. The mass of the negative copper electrode grows. As a result, the concentration of $CuSO_4$ in aqueous solution and the vessel 2 is reduced during the process of charging. Finally, when the concentration of the aqueous solution $CuSO_4$ or in other words of ions $Cu^{++}$ and ions $SO_4^-$ becomes very small and a resistance becomes high, electrical current of charging is significantly reduced.

Therefore the number of negative ions $SO_4^-$ and correspondingly positive ions $Cu^{++}$ accumulated near the front walls 6 and 7 in the vessels 2 and 1 is determined by the concentration of electrolyte 5 and the volume of the vessel 2 or in other words the volume of the electrolyte in the vessel 2 and the thickness of the copper electrode 3 in the vessel 1.

The high density of the ions $Cu^{++}$ near the front wall in the vessel 1 and of $SO_4^-$ near the front wall in the vessel 2 due to the high attraction toward one another is preserved for a long time after the charging process is finished. As a result, the battery in the charged condition can be stored for a very long time.

The displacement of the positive ions to the front wall 7 of the vessel 1 and of the negative ions to the front wall 6 of the vessel 2 can be substantially intensified during charging by generating an electrical field in each of the vessels. This can be achieved by introducing additional electrodes in each of the vessels at an opposite side to the main electrode of the same vessel. For example, copper nets 16 are introduced into the vessels 1 and copper nets 7 introduced into the vessel 2. The copper nets assume a charge of the electrolyte and generates in each vessel an electrical field which results in more intense movement of the positive ions $Cu^{++}$ toward the front wall 7 in the vessel 1, and negative ions $SO_4^-$ toward the front wall 6 in the vessel 2. After the charging of the battery, the metal nets can be removed.

The discharge of the battery for using the electric current by a consumer is performed in the following manner. The positive copper electrode 3 is moved from the rear wall 9 in the vessel 1 toward the front wall 7. When the positive copper electrode 3 is moved toward the front wall and then is introduced into the positively charged layer with the ions $Cu^{++}$, the positive potential of the positive electrode 3 becomes higher and increases to a value provided in these layers. As a result the positive charge ions $Cu^{++}$ located near the positive electrodes 3 will give their positive charge to the electrode. When a desired value of voltage between the electrodes 3 and 4 is achieved, the movement of the electrode 3 is stopped. When now the electrical battery is turned on, electrical current is supplied to a consumer, and the process of discharge of the electrical battery starts. In the vessel 1 with the positive copper electrode 3, due to the direct contact of the positive electrode 3 with the layer of positive ions $Cu^{++}$, the positive ions $Cu^{++}$ give their charge to the positive copper electrode 3, they are neutralized, and as neutral atoms of copper deposited on the surface of the copper electrode 3. The mass of the positive copper electrode 3 is increased. Thereby during the process of discharging the electrochemical process in the vessel 1 moves in an opposite direction to that during charging.

Because during discharge the positive ions $Cu^{++}$ move from the front wall 7 to the positive electrode 3 and give their charge to it, the intensity of the electrical field between the front walls of the vessels is reduced. At the same time, in the vessel 2 with the negative electrode 4, negative ions $SO_4^-$ are not retained near the front wall 6 with the previous attraction force, and the forces of repelling between the negative ions $SO_4^-$ will prevail over weakened forces of attraction, due to the lost positive ions $Cu^{++}$ from the vessel 1, and negative ions $SO_4^-$ move toward the negative copper electrode 4. The ions $SO_4^-$ approach the surface of the negative copper electrode 4, give their charge to it, and at the surface of the negative copper electrode 4 $CuSO_4$ is formed, which in water forms ions $Cu^{++}$ and $So^-$. The concentration of electrolyte is increased and the mass of the negative copper electrode 4 is reduced. Thereby during the discharging process the electro chemical process in the vessel 2 moves in an opposite direction as compared charging.

During the discharge, both positive ions $Cu^{++}$ and negative ions $SO_4^-$ contribute their share to the value of the current, each in a corresponding vessel. The vessels are controlled by the joint electrical field between the front walls of the vessels.

With the growth of the electrolyte in the vessel 2, the resistance of the electrolyte is reduced, and at the same time losses for inner resistance are reduced. Due to the high voltage which is taken during the discharge, a high power is provided with a very low discharge current, for example 0.15 amp. Therefore, energy losses are low, and with the high capacity of the electrical battery, the process of discharging of the electrical battery is performed over a very long time.

If during discharge of the electrical battery, there is a tendency to reducing of the voltage, a further movement of the positive electrode 3 toward the front wall 7 restores the desired voltage, and the process of discharging practically is performed at constant voltage for a long time. When the whole charge accumulated near the front walls during the charging is spent, the voltage between electrodes is reduced to zero. However, the process of discharging can be stopped at a certain value of the voltage which is different from zero. When the discharging of the electrical battery is finished, the positive copper electrode 3 is moved back to the rear wall 9 of the vessel 1. The electrical battery is ready for a new process of charging.

It will be understood that each of the elements described above, or two or more together, may also find a useful application in other types of constructions differing from the types described above.

While the invention has been illustrated and described as embodied in electrical battery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electrical battery, comprising a vessel accommodating an electrolyte;
   a positive electrode and a negative electrode arranged in said vessel at a distance from one another in contact with the electrolyte; and a partition arranged in said vessel between said electrodes so that positive ions formed by an electrolytic process from a material of the positive electrode in the electrolyte move toward one side of the partition, and negative ions formed by an electrolytic process from a material of the electrolyte move to an opposite side of the partition during charging of the battery, so that the positive ions and the negative ions at both sides of the partition are attracted to one another and accumulate at both sides of the partition in great quantities so as to provide a significant charge in the battery, one of said electrodes being movable toward said partition to be located in a zone of accumulation of the ions of corresponding charge so as to obtain said charge with high voltage, so that a discharge of the battery is performed at high power, with high voltage and with low current.

2. An electrical battery as defined in claim 1, wherein said movable electrode is the positive electrode.

3. An electrical battery as defined in claim 1, wherein said vessel is formed by two individual subvessels which do not communicate with one another and each contain a respective one of said electrodes in said electrolyte, said partition being located between said vessels.

4. An electrical battery as defined in claim 1, wherein said partition is composed of a material that prevents an electrical discharge through it.

5. An electrical battery as defined in claim 1, wherein said electrodes are composed of copper.

6. An electrical battery as defined in claim 1; and further comprising means for causing the movement of the ions from an respective one of said electrodes toward a respective side of said partitions, said means including two additional electrodes each introducable into an area between a respective one of said first mentioned electrodes and said partition, said additional electrodes being removable from the battery after charging of the battery.

* * * * *